United States Patent
Washizawa

(10) Patent No.: US 9,652,437 B2
(45) Date of Patent: May 16, 2017

(54) SOLUTION METHOD AND SOLUTION APPARATUS FOR UNDERDETERMINED SYSTEM OF LINEAR EQUATIONS

(71) Applicant: CANON KABUSHIKI KAISHA, Tokyo (JP)

(72) Inventor: Teruyoshi Washizawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 14/554,389

(22) Filed: Nov. 26, 2014

(65) Prior Publication Data

US 2015/0161077 A1    Jun. 11, 2015

(30) Foreign Application Priority Data

Dec. 5, 2013  (JP) .................. 2013-251768
Aug. 29, 2014  (JP) .................. 2014-175455

(51) Int. Cl.
*G06F 17/12*  (2006.01)

(52) U.S. Cl.
CPC ................. *G06F 17/12* (2013.01)

(58) Field of Classification Search
CPC ....................................... G06F 17/12
See application file for complete search history.

(56) References Cited

U.S. PATENT DOCUMENTS

2013/0262661 A1* 10/2013 Malboubi ............. H04L 41/142
                                                              709/224
2015/0221124 A1*  8/2015 Noo ..................... G01N 23/046
                                                              382/131

OTHER PUBLICATIONS

Wei Dai and Olgica Milenkovic, "Subspace Pursuit for Compressive Sensing Signal Reconstruction", Department of Electrical and Computer Engineering, University of Illinois at Urbana-Champaign, pp. 1-19, Jan. 8, 2009.
Amir Beck and Marc Teboulle, "A Fast Iterative Shrinkage-Thresholding Algorithm for Linear Inverse Problems", SIAM Journal of Imaging Sciences, vol. 2, No. 1, pp. 183-202, 2009.
U.S. Appl. No. 14/554,371, filed Nov. 26, 2014, Teruyoshi Washizawa.

* cited by examiner

Primary Examiner — Matthew Sandifer
(74) Attorney, Agent, or Firm — Fitzpatrick, Cella, Harper & Scinto

(57) ABSTRACT

A solution method for solving an underdetermined system of linear equations, in which the number of elements of a variable to be determined is N and the number of linear equations is M (where M and N are integers satisfying $1 \leq M < N$), using iterative calculations, comprises, in each iteration: an extraction step of extracting at least M non-zero element candidates from the N elements of the variable; a subproblem solving step of setting a subproblem having only the extracted non-zero element candidates as a variable, and solving the subproblem as an ill-posed problem; and an updating step of updating values of the N elements of the variable to be determined on the basis of values of the non-zero element candidates obtained in the subproblem solving step.

9 Claims, 7 Drawing Sheets

SOLUTION METHOD AND SOLUTION APPARATUS FOR UNDERDETERMINED SYSTEM OF LINEAR EQUATIONS

BACKGROUND OF THE INVENTION

Field of the Invention

The present invention relates to a solution method and a solution apparatus for solving a system of linear equations, and more particularly to a technique of solving an underdetermined system of linear equations in which the number of equations is smaller than the number of variables.

Description of the Related Art

In a medical instrument used for X ray computed tomography (CT), magnetic resonance imaging (MRI), or the like, a three-dimensional structure of the inside of a human body is reconstructed from an observation image projected onto a two-dimensional plane. When a three-dimensional structure to be estimated is set as an unknown vector x, an observation process such as X ray projection is set as a matrix A, and an observation signal is set as b, the observation process can be formulated as follows:

$$Ax=b \tag{1}$$

Here, A may also be referred to as a coefficient matrix, and b may also be referred to as a constant vector or a right side vector.

When solving Equation (1), the number of observations is typically increased in order to improve the estimation precision of the three-dimensional structure. Hereafter, a dimension of a signal x to be estimated is set as N, a dimension of the observation signal b is set as M, and it is assumed that M<N. In Equation (1), the number M of equations is smaller than the dimension N of the variable, and therefore Equation (1) is referred to as an underdetermined system of linear equations.

An underdetermined system of linear equations has an infinite number of solutions, and therefore a solution is typically determined uniquely by applying a technique known as regularization.

In a recently proposed technique, an underdetermined system of linear equations is solved with a high degree of precision by assuming that the signal to be estimated is sparse (in other words, assuming that a majority of elements of the vector x are zero). This technique is known as sparse regularization, and is currently attracting attention as an effective technique for removing noise from images, reconstructing medical images, and so on, for example.

Algorithms of sparse regularization can be broadly divided into two types, namely a "greedy algorithm" and "L1 regularization". A method exhibiting the most favorable performance with a greedy algorithm is subspace pursuit (abbreviated at SP hereafter), disclosed in Non-patent Literature (NPL) 1, and a method exhibiting the most favorable performance with L1 regularization is FISTA, disclosed in NPL 2.

A flow of processing performed in SP, with which a more precise solution can be found at a much higher speed than with FISTA, will now be described using FIG. 3.

In step S301, values of the coefficient matrix A and the constant vector b are set. Further, the number of non-zero elements K is set. The value of K is determined by a user, and K may be set at any value that satisfies K≤M/2.

Below, a set of element numbers of the variable x is denoted as $\Omega$, and a universal set is denoted as $\Omega_{all}:=\{1, 2, \ldots, N\}$.

In step S302, the variable $x^{(0)}$ is initialized. Further, a set $\Omega^{(0)}$ of element numbers of non-zero element candidates is initialized as an empty set. The number of iterations t is set at 1. Note that the characters in superscript parentheses express the number of iterations.

In step S303, a residual $r^{(t-1)}:=b-Ax^{(t-1)}$ is calculated using the variable $x^{(t-1)}$.

In step S304, a pseudo-error $\epsilon^{(t-1)}:=A^T r^{(t-1)}$ is calculated, and K elements are extracted in order from the element having the pseudo-error with the largest absolute value. A set of element numbers of the K extracted elements is set as $\Delta\Omega^{(t)}$.

In step S305, a set $\Omega_p^{(t)}=\Omega^{(t-1)}\cup\Delta\Omega^{(t)}$ is determined, and a projection operator $P^{(t)}:=\Omega_{all}\to\Omega_p^{(t)}$ is generated. The number of elements in $\Omega_p^{(t)}$ is no smaller than K and no larger than M. For example, when $\Omega_{all}:=\{1, 2, \ldots, 5\}$ and $\Omega_p^{(t)}:=\{1, 3, 5\}$, the projection operator $P^{(t)}$ takes the form of a following matrix:

$$P^{(t)} = \begin{pmatrix} 1 & 0 & 0 & 0 & 0 \\ 0 & 0 & 1 & 0 & 0 \\ 0 & 0 & 0 & 0 & 1 \end{pmatrix} \tag{2}$$

In step S306, a subproblem expressed by a following equation is constructed and solved.

$$(A(P^{(t)})^T)z^{(t)}=b \tag{3}$$

Here, $z^{(t)}:=P^{(t)} x^{(t)}$ is a variable of the subproblem, a dimension of which is no smaller than K and no larger than M.

When the dimension is M, Equation (3) is regular such that a solution is determined uniquely, and therefore a normal solution method for a system of equations, for example a direct method such as the Jacobi method, the Gauss-Seidel method, or the SOR method, or an iterative solution method such as the conjugate gradient method, is used. When the dimension is smaller than M, on the other hand, this indicates an overdetermined system, and therefore the subproblem is considered as a problem of the method of least squares. Accordingly, a following equation, for example, is solved:

$$(P^{(t)}A^T A(P^{(t)})^T)z^{(t)}=P^{(t)}A^T b \tag{4}$$

In step S307, a value of $x^{(t)}$ is calculated from a following equation using a solution $z^{(t)}$ obtained in step S306.

$$x^{(t)}=(P^{(t)})^T z^{(t)} \tag{5}$$

In step S308, K elements are extracted from $x^{(t)}$ in order from the element having the largest absolute value, and a set of element numbers of the K extracted elements is set as $\Omega^{(t)}$. $\Omega^{(t)}$ is used in step S305 of the next iterative calculation.

Steps S303 to S308 are then repeated until a predetermined convergence condition is satisfied.

[Non-patent Literature 1] Wei Dai and Olgica Milenkovic: "Subspace Pursuit for Compressive Sensing Signal Reconstruction," IEEE Transactions on Information Theory, VOL. 55, NO. 5, pp. 2230-2249, MAY 2009.

[Non-patent Literature 2] Amir Beck and Marc Teboulle: "A Fast Iterative Shrinkage-Thresholding Algorithm for Linear Inverse Problems," SIAM Journal on Imaging Sciences, Vol. 2, No. 1, pp. 183-202, 2009.

SUMMARY OF THE INVENTION

Performances of the two conventional solution methods SP and FISTA can be seen on a perfect reconstruction map shown in FIG. 5. The number of estimated signals N, or in other words the number of variables N, is 256. In FIG. 5, respective solution methods were used in relation to a matrix A generated in accordance with a normal distribution and ten correct solution cases, and a region in which nine cases had a relative error of no more than 5% was set as a perfect reconstruction region. The abscissa in the drawing shows a sparsity (=the number of non-zero elements/the number of estimation signals), and the ordinate shows an observation rate (=the number of observation signals/the number of estimation signals). Lines on the graph correspond to the respective solution methods, and an upper left region of the lines is the perfect reconstruction region. A line 501 shows a theoretical limit, a line 502 shows the limit of SP, and a line 503 shows the limit of FISTA. It is evident from the drawing that room remains for improvement in both methods in relation to the theoretical limit. In the case of a medical instrument used for X ray CT, MRI, or the like, for example, a measurement time is preferably shortened by reducing the number of observations in order to lighten physical and psychological loads on a subject. In practical terms, therefore, it is extremely important to reduce the required number of observation signals.

The present invention has been designed in consideration of this problem, and an object thereof is to provide a solution technique with which a higher degree of estimation precision can be realized at a smaller observation rate (with a smaller number of observation signals).

The present invention in its first aspect provides a solution method for solving an underdetermined system of linear equations, in which the number of elements of a variable to be determined is N and the number of linear equations is M (where M and N are integers satisfying $1 \leq M < N$), using iterative calculations performed by a computer, the method comprising, in each iteration, operating said computer to execute: an extraction step of extracting at least M non-zero element candidates from said N elements of said variable; a subproblem solving step of setting a subproblem having only said extracted non-zero element candidates as a variable, and solving said subproblem as an ill-posed problem; and an updating step of updating values of said N elements of said variable to be determined on the basis of values of said non-zero element candidates obtained in said subproblem solving step.

The present invention in its second aspect provides a solution apparatus for solving an underdetermined system of linear equations, in which the number of elements of a variable to be determined is N and the number of linear equations is M (where M and N are integers satisfying $1 \leq M < N$), using iterative calculations, the apparatus comprising: a calculating unit configured to perform said iterative calculations, wherein in each iteration, said calculating unit executes: an extraction step of extracting at least M non-zero element candidates from said N elements of said variable; a subproblem solving step of setting a subproblem having only said extracted non-zero element candidates as a variable, and solving said subproblem as an ill-posed problem; and an updating step of updating values of said N elements of said variable to be determined on the basis of values of said non-zero element candidates obtained in said subproblem solving step.

The present invention in its third aspect provides a subject information acquisition apparatus for reconstructing image data representing information relating to an inside of a subject from observation data obtained by an observation system, comprising: a data obtaining unit configured to obtain data representing characteristics of said observation system and said observation data obtained by said observation system; and the solution apparatus for an underdetermined system of linear equations according to the present invention, wherein said solution apparatus calculates a solution of a system of linear equations Ax=b, where said data representing said characteristics of said observation system are set as a matrix A, said observation data obtained by said observation system are set as a constant vector b, and said image data representing said information relating to said inside of said subject are set as an unknown variable x.

The present invention in its fourth aspect provides a non-transitory computer readable storage medium, storing a program for causing a computer to execute said respective steps of said solution method for an underdetermined system of linear equations according to the present invention.

According to the present invention, a solution technique with which a higher degree of estimation precision can be realized at a smaller observation rate (with a smaller number of observation signals) can be provided.

Further features of the present invention will become apparent from the following description of exemplary embodiments with reference to the attached drawings.

DESCRIPTION OF THE EMBODIMENTS

The present invention relates to a solution technique for solving an underdetermined system of linear equations Ax=b by performing iterative calculations using a computer, and proposes an improved algorithm for the subspace pursuit (SP) method described above.

The method according to the present invention differs from the conventional SP method as follows. In SP, a subproblem of an overdetermined system having no more than M dimensions is set in order to determine a value of a non-zero element, whereas in the method according to the present invention, a subproblem (an ill-posed problem) of an underdetermined system having no less than M dimensions is set. It is known that in SP, the value of K affects the estimation precision, and it is therefore necessary for practical purposes to set K at an appropriate value in accordance with the problem to be solved. In the method according to the present invention with regard to this point, the number of non-zero elements does not have to be set. Therefore, a user load can be lightened, and stable estimation precision can be expected.

In the method according to the present invention, various regularization algorithms can be used as methods for solving the subproblem. Preferably, sparse regularization is used as the method of solving the subproblem. As described above, the algorithms of sparse regularization can be broadly divided into a greedy algorithm (GA) and L1 regularization. With a GA, however, similar problems to those of SP may arise, and therefore L1 regularization is preferably used.

Further, the method according to the present invention differs from conventional L1 regularization as follows. In conventional L1 regularization, the original problem of N dimensions is solved, whereas in the present invention, a subproblem having no less than M dimensions and no more than 2M dimensions is solved. As a result, the present invention is greatly advantaged in terms of calculation time.

Embodiment

A preferred embodiment of the solution method and solution apparatus according to the present invention will be described in detail below with reference to the drawings.

(Configuration of Solution Apparatus)

Figure 2:
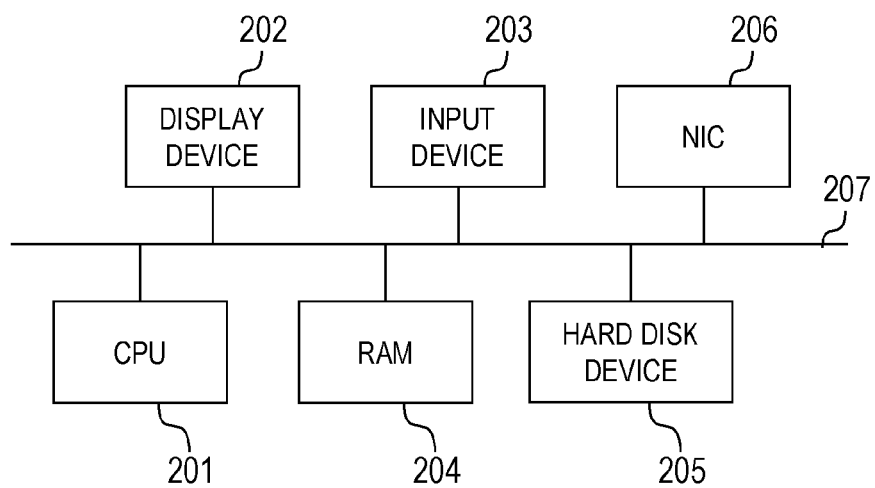
FIG. 2 is a block diagram showing a configuration of a solution apparatus according to this embodiment of the present invention.
Figure 3:
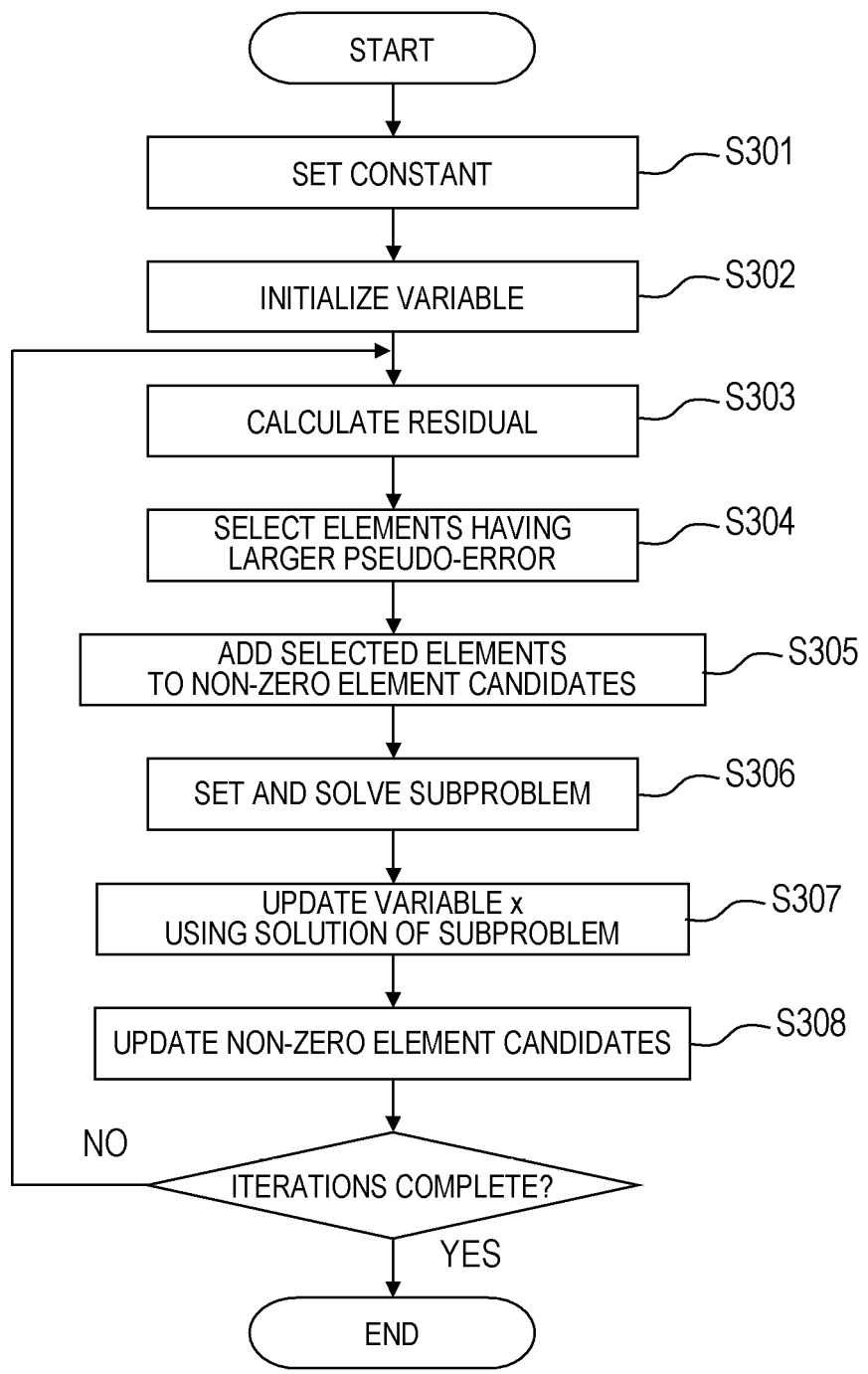
FIG. 3 is a flowchart showing an example of calculation processing performed in SP.

FIG. 2 is a block diagram showing a basic configuration of a computer that functions as a solution apparatus according to an embodiment of the present invention. The computer is mainly constituted by a CPU 201, a display device 202, an input device 203, a RAM 204, a hard disk device 205, an NIC 206, and so on, which are connected to each other via a bus 207.

The CPU (Central Processing Unit) 201 performs overall control of the apparatus using programs and data stored in the RAM (a main memory) 204, and executes various processing described below. The display device 202 is constituted by a liquid crystal display or the like, and is capable of displaying processing results (an obtained solution, a reconstructed image) obtained by the CPU 201 in the form of alphanumerical characters, images, and so on. The input device 203 is constituted by an operating device such as a keyboard or a mouse, and is capable of inputting various instructions into the CPU 201. The RAM 204 includes an area for temporarily storing programs and data loaded from the hard disk device 205, and a work area required by the CPU 201 to execute various processing. An OS (an operating system), and programs and data for causing the CPU 201 to execute the various processing, described below, to be performed by the computer are stored in the hard disk device 205. These programs are loaded to the RAM 204 and executed by the CPU 201, whereby the computer functions as a solution apparatus for numerically solving a system of linear equations. The network interface controller (NIC) 206 functions as an interface during data communication with an external apparatus. The computer exchanges programs and data with the external apparatus via the NIC 206.

Note that instead of the programs and data stored in the hard disk device 205, programs and data received from an external apparatus via the NIC 206 may be used in the processing executed by the CPU 201. In other words, the solution apparatus may employ a system configuration such as a client server, cloud computing, or grid computing. Alternatively, the functions of the solution apparatus may be packaged in a built-in computer installed in a medical instrument or an image analysis instrument. Alternatively, all or a part of the functions of the solution apparatus may be constituted by a circuit such as an ASIC or an FPGA.

(Solution Method)

Next, a method of solving an underdetermined system of linear equations according to this embodiment will be described. It is assumed here that Ax=b is given as the system of linear equations to be solved. A is a coefficient matrix, b is a constant vector (a right side vector), and x is a variable vector to be determined. Further, a dimension of the variable vector, or in other words the number of elements of the variable x, is N, a dimension of the constant vector, or in other words the number of equations, is M, and $1 \leq M < N$ (where M and N are integers).

Figure 1:
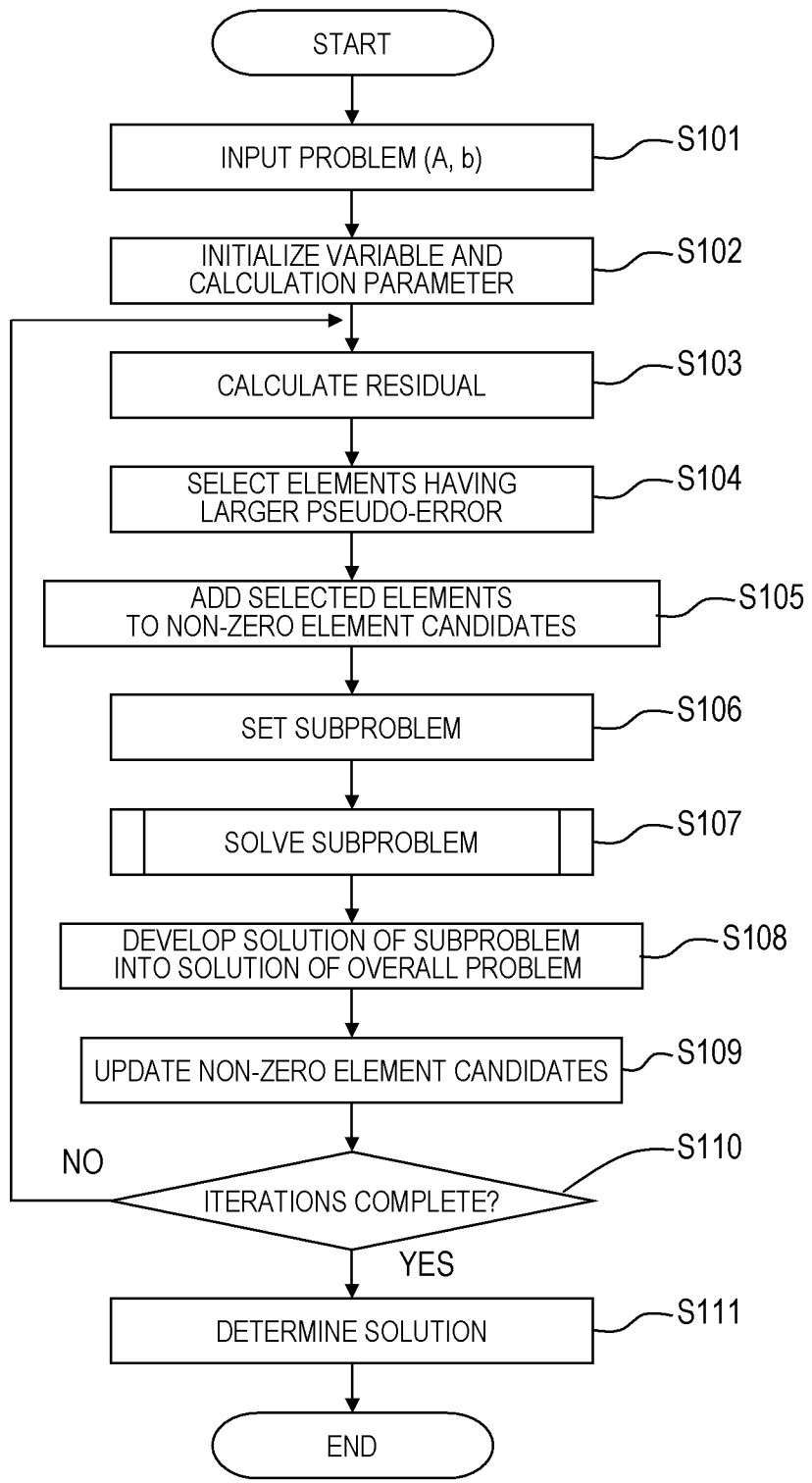
FIG. 1 is a flowchart showing processing of a solution method according to an embodiment of the present invention.

FIG. 1 is a flowchart showing a flow of solution processing executed by the solution apparatus. A main body for executing the processing shown in FIG. 1 is the CPU (calculating unit) 201 of the solution apparatus.

In step S101, the CPU 201 sets a problem input by a user, or in other words sets the value of the coefficient matrix A and the value of the constant vector b.

In step S102, the CPU 201 allocates a memory area for the variable x, and sets the variable x at an initial value $x^{(0)}$. Further, the CPU 201 sets the number of iterations t at 1.

In step S103, the CPU 201 calculates a residual $r^{(t-1)} := b - Ax^{(t-1)}$ using the variable $x^{(t-1)}$.

In step S104, the CPU 201 calculates a pseudo-error $\epsilon^{(t-1)} := A^T r^{(t-1)}$ using the residual $r^{(t-1)}$. The CPU 201 then extracts M elements in order from the element having the pseudo-error with the largest absolute value, and sets a set of element numbers of the M extracted elements as $\Delta\Omega^{(t)}$.

In step S105, the CPU 201 determines a set of non-zero element candidates $\Omega_p^{(t)} = \Omega^{(t-1)} \cup \Delta\Omega^{(t)}$ and generates a projection operator $P^{(t)} := \Omega_{all} \to \Omega_p^{(t)}$. $\Omega_{all}$ is a universal set of element numbers. Here, the number of elements in $\Omega_p^{(t)}$ is no smaller than M and no larger than 2M. For example, when $\Omega_{all} := \{1, 2, \ldots, 5\}$ and $\Omega_p^{(t)} := \{1, 3, 5\}$, the projection operator $P^{(t)}$ takes the form of a following matrix.

$$P^{(t)} = \begin{pmatrix} 1 & 0 & 0 & 0 & 0 \\ 0 & 0 & 1 & 0 & 0 \\ 0 & 0 & 0 & 0 & 1 \end{pmatrix} \quad (6)$$

Note that the projection operator does not have to be calculated explicitly. During program packaging, therefore, only the element numbers of the non-zero element candidates (in other words, the elements of $\Omega_p^{(t)}$) need be stored in the memory. Likewise when dealing with the subproblem to be described below, it is more advantageous in terms of a calculation amount to perform an operation to extract a part of the non-zero element candidates corresponding to the element numbers than to calculate the projection operator $P^{(t)}$.

The processing of steps S103 to S105 corresponds to an extraction step of extracting at least M non-zero element candidates. In the extraction step according to this embodiment, the non-zero element candidates are updated on the basis of the residual $r^{(t-1)}$ of the system of linear equations. More specifically, an element estimated to have a large error $\epsilon^{(t-1)}$ is selected from N elements on the basis of the residual $r^{(t-1)}$ ($\Delta\Omega^{(t)}$), whereupon the newly selected element is added to the non-zero element candidates ($\Omega^{(t-1)}$) extracted in a previous iteration ($\Omega^{(t-1)} \cup \Delta\Omega^{(t)}$). By performing this updating operation, non-zero element extraction and correction can be performed appropriately.

Next, in step S106, the CPU 201 sets a subproblem having only the non-zero element candidates as a variable. When the variable of the non-zero element candidates is set as $z^{(t)}$, the subproblem is expressed by a following equation:

$$(A(P^{(t)})^T)z^{(t)} = b \tag{7}$$

Here, $z^{(t)} := P^{(t)} x^{(t)}$. The number of elements of the variable $z^{(t)}$ is no smaller than M and no larger than 2M. Since the number of equations is M, all cases in which the number of elements is not M correspond to an ill-posed problem. Accordingly, the subproblem of Equation (7) is solved using a regularization method.

In step S107, the CPU 201 determines the value of the variable $z^{(k)}$ by solving the subproblem of Equation (7) using the sparse regularization method. In this embodiment, the sparse regularization method FISTA is applied as the method of solving the subproblem.

In FISTA, Equation (7) is satisfied and a solution vector z having a small number of non-zero elements is obtained by retrieving a minimum value of an objective function $L_2$ defined by Equation (8) below.

$$L^2 := (\tfrac{1}{2}) \|b - (A(P^{(t)})^T) z\|_2^2 + \lambda \|z\|_1 \tag{8}$$

A first item of the objective function is an L2 norm of a residual vector of the system of equations shown in Equation (7), and is referred to as a residual norm. Further, a second term is a term obtained by multiplying a constant $\lambda$ by an L1 norm (a sum of absolute values of all elements of the vector z) of the solution vector z. This objective function $L_1$ has a property whereby the first term decreases as the solution vector z approaches the correct solution, and the second term decreases as the solution vector z increases in sparsity (i.e. as the number of zero elements increases).

Figure 4:
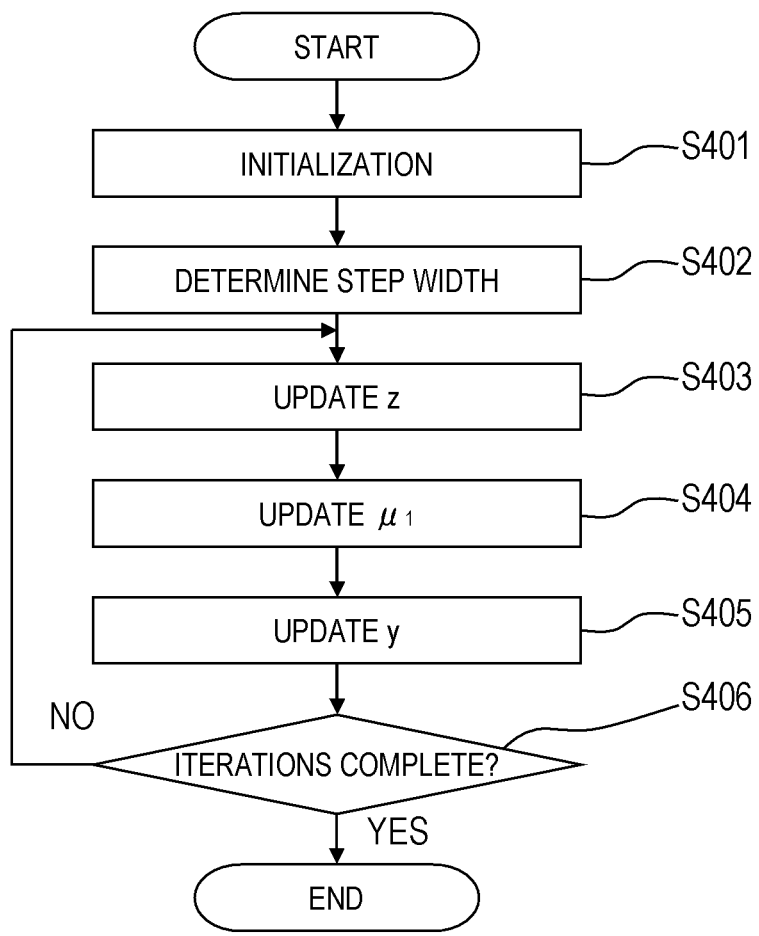
FIG. 4 is a flowchart showing an example of calculation processing performed in FISTA.

A flow of processing performed in FISTA will now be described using FIG. 4.

In step S401, the CPU 201 sets variables $z^{(0)}$ and $y^{(1)}$ at initial values, sets the number of iterations k at 1, and sets $\mu^{(1)}$ at 1.

In step S402, the CPU 201 determines a step width $\beta$ of the variable z. The inverse of the Lipschitz constant of $\nabla L_2$, which is defined by a following equation, is set as the step width $\beta$, but as the dimension increases, the calculation time lengthens, and therefore an approximate value may be substituted. Note, however, that the approximate value must not exceed the inverse of the Lipschitz constant.

$$\nabla L_2 := \frac{\partial L_2}{\partial z} = P^{(t)} A^T A (P^{(t)})^T \tag{9}$$

The step width $\beta$ may also be determined by a golden section search. Further, when calculation thereof is possible, the step width $\beta$ may also be determined effectively using a following equation:

$$\beta = \|e^{(k)}\|_2^2 / \|A(P^{(t)})^T e^{(k)}\|_2^2$$

where $$e^{(k)} = A^T(b - (A(P^{(t)})^T) z^{(k-1)})$$

In step S403, the CPU 201 calculates the variable $z^{(k)}$ using a following equation:

$$z^{(k)} = \text{prox}_\gamma(y^{(k)} - \gamma \nabla L_2(y^{(k)})) \tag{10}$$

Here, $\text{prox}_\gamma$ is a function defined by following equations:

$$\text{prox}_\gamma(x) := \begin{cases} \text{sign}(x)|x - \gamma|, & \text{if } x > \gamma \\ 0, & \text{otherwise} \end{cases} \tag{11}$$

$$\text{sign}(x) := \begin{cases} 1, & \text{if } x > 0 \\ 0, & \text{if } x = 0 \\ -1, & \text{if } x < -1 \end{cases} \tag{12}$$

$\gamma$ is set as follows, for example, so as to decrease monotonically relative to the number of iterations.

$$\gamma = \gamma \exp(-10 k / k_{MAX})$$

Here, $k_{MAX}$ is a maximum number of iterations set by the user.

In step S404, the CPU 201 calculates $\mu^{(k+1)}$ using a following equation:

$$\mu^{(k+1)} = \frac{1 + \sqrt{1 + 4(\mu^{(k)})^2}}{2} \tag{13}$$

In step S405, the CPU 201 calculates $y^{(k+1)}$ using a following equation:

$$y^{(k+1)} = z^{(k)} + \frac{\mu^{(k)} - 1}{\mu^{(k+1)}} (z^{(k)} - z^{(k-1)}) \tag{14}$$

Instead of the update equation described above, a following equation may be used in accordance with ISTA:

$$y^{(k+1)} = z^{(k)}$$

The CPU 201 repeats steps S403 to S405 until a predetermined convergence condition is satisfied (step S406). The convergence condition may be determined to be satisfied when, for example, the value of the objective function $L_2$ falls below a predetermined threshold, a value of the residual norm (corresponding to the first term of the objective function $L_2$) in Equation (7) falls below a predetermined threshold, the number of iterations k reaches a predetermined number, and so on. Alternatively, a convergence condition combining at least two of the objective function, the residual norm, and the number of iterations may be set. A combination is a logical product or a logical sum of a plurality of conditions (propositions). It is known, however, that when the subproblem is solved until the residual norm is small enough, the solution of the overall problem does not converge. Therefore, ten iterations, for example, are the sufficient number of iterations to solve the subproblem.

When it is determined in step S406 that the predetermined convergence condition is satisfied, the solution $z^{(t)}$ of the subproblem of Equation (7) is confirmed, whereupon the processing advances to step S108 in FIG. 1. The processing of steps S106 and S107 corresponds to a subproblem solving step of solving the subproblem as an ill-posed problem.

In step S108, the CPU 201 develops the solution $z^{(t)}$ (i.e. the value of the non-zero element candidates) of the subproblem obtained in step S107 into the solution x of the overall problem. More specifically, the values of the N elements of the variable $x^{(t)}$ are updated by calculating a following equation:

$$x^{(t)} = (P^{(t)})^T z^{(t)} \tag{15}$$

In step S109, the CPU 201 extracts M elements from $x^{(t)}$ in order from the element having the largest absolute value, and sets a set of element numbers of the M extracted elements as $\Omega^{(t)}$. $\Omega^{(t)}$ is used in the steps (S103 to S105) for extracting the non-zero element candidates during the next iterative calculation.

Step S110 is a step of determining whether or not the iterative calculations are complete. The CPU 201 evaluates whether or not a state of the iterative calculations satisfies a predetermined convergence condition. When the convergence condition is not satisfied, the CPU 201 increments the number of iterations t and then returns to step S103. When the convergence condition is satisfied, the CPU 201 exits the iterative calculations and advances to step S111. The convergence condition may be determined to be satisfied when, for example, a value of a predetermined objective function falls below a predetermined threshold, a value of a residual norm (an L2 norm of a residual vector b−Ax) falls below a predetermined threshold, the number of iterations t reaches a predetermined number, and so on. Any objective function defined as a function of the variable x to be determined may be used as the objective function. Alternatively, a convergence condition combining at least two of the objective function, the residual norm, and the number of iterations may be set instead of a single condition (proposition). A combination is a logical product or a logical sum of a plurality of conditions (propositions). For example, the convergence condition may be determined to be satisfied when "the number of iterations exceeds a predetermined number and the value of the objective function falls below a threshold", or when "the value of the objective function falls below a first threshold or the value of the residual norm falls below a second threshold". Alternatively, the convergence condition may be determined to be satisfied when the values of the objective function and the residual norm are smaller than a threshold a plurality of times.

Step S111 is a step of determining the solution of the system of linear equations following completion of the iterative calculations. Most simply, the value of the variable x obtained in the final iterative calculation may be selected as the solution of the equation. Alternatively, the CPU 201 may store a variable x at which the value of the objective function or the residual norm is minimized, from among the iterative calculations performed in steps S103 to S109, in the memory, and output the value of the variable x at that time as an optimum solution.

Figure 5:
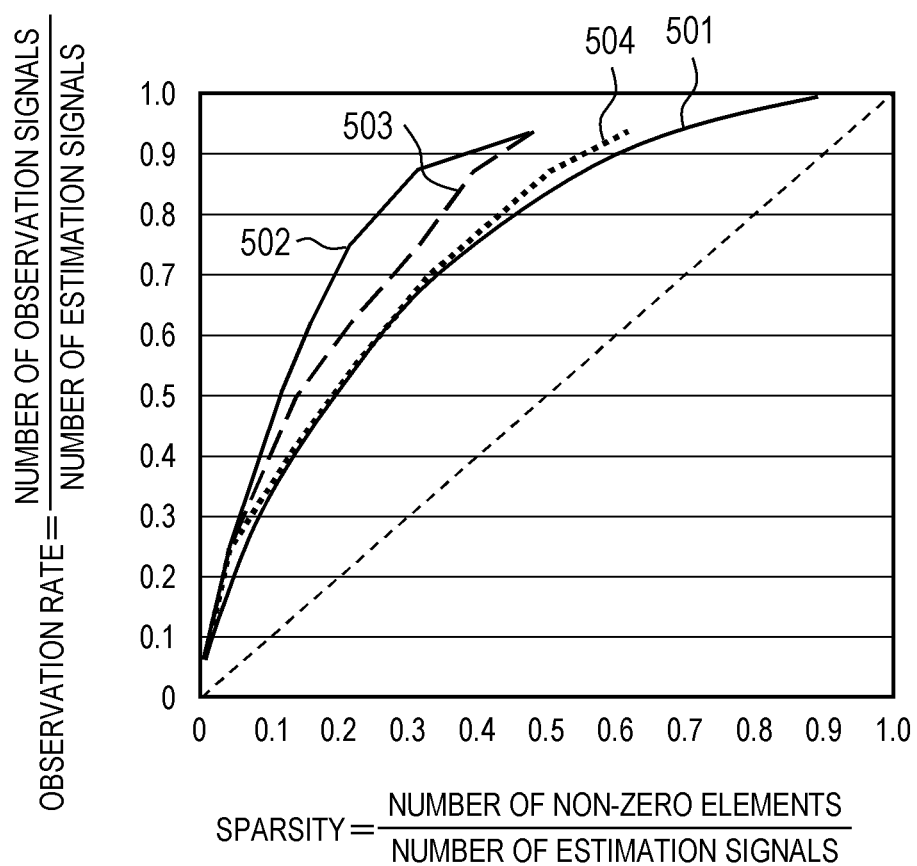
FIG. 5 is a perfect reconstruction map showing respective performances of conventional techniques and the solution method according to this embodiment of the present invention.

By performing the processing described above, the solution of an underdetermined system of linear equations can be determined with a high degree of precision. The performance of the solution method according to this embodiment is shown on a line 504 on the perfect reconstruction map of FIG. 5. The performance (504) of the method according to this embodiment is closer to the theoretical limit (501) than the conventional methods SP (502) and FISTA (503). In particular, it can be seen that reconstruction is possible when the sparsity is in a range starting from 0.2 or higher, where reconstruction is impossible with the conventional methods.

Figure 7:
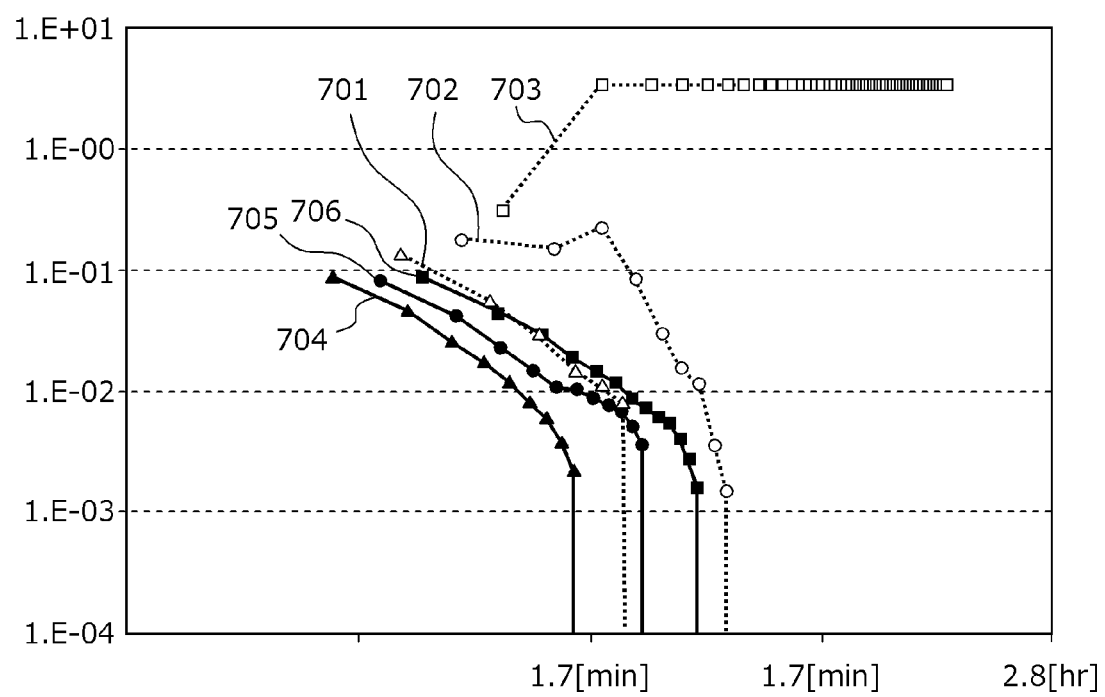
FIG. 7 is a view showing convergence of an error norm with a conventional technique (the SP method) and the method according to this embodiment of the present invention.

FIG. 7 shows results obtained when the present invention is applied to the problem of noise removal. A subject image is 64×64 pixels, and the number of equations, or in other words the number of observations, is identical to the pixel count. However, noise is superimposed on the subject image. In the drawing, the abscissa shows the calculation time, and the ordinate shows an error norm between a correct solution and an approximate solution. Further, results obtained with the SP method are set as 701, 702, 703, results obtained with the method according to this embodiment are set as 704, 705, 706, and respective calculation parameters thereof are set as 1024, 1600, 2048. The number of non-zero elements in the correct solution is 800, and in both the SP method and the method according to this embodiment, the solution converges on the correct solution at the parameter values 1024 (701 and 704) and 1600 (702 and 705). However, when the parameter value deviates greatly from the number of non-zero elements in the correct solution, or in other words when the parameter value is 2048, the solution converges on the correct solution with the method according to this embodiment (706), but does not converge with the SP method (703). It can therefore be seen that the method according to this embodiment is robust with respect to the calculation parameters of the SP method, or in other words the number of non-zero elements to be set by the user. Moreover, with the method according to this embodiment, the subproblem is not solved perfectly, and therefore the calculation time can be shortened in comparison with the SP method. This can be confirmed by comparing 701 with 704 and 702 with 705.

(Example of Application)

An example in which the solution method according to this embodiment is applied to image reconstruction processing in a subject information acquisition apparatus will now be described. The subject information acquisition apparatus is an apparatus that reconstructs image data representing information relating to the inside of a subject from observation data obtained by an observation system, for example a medical image diagnosis apparatus (an X ray CT apparatus, an MRI apparatus, a photoacoustic tomography apparatus, an ultrasound diagnosis apparatus, and so on) or a non-destructive examination apparatus.

Figure 6:
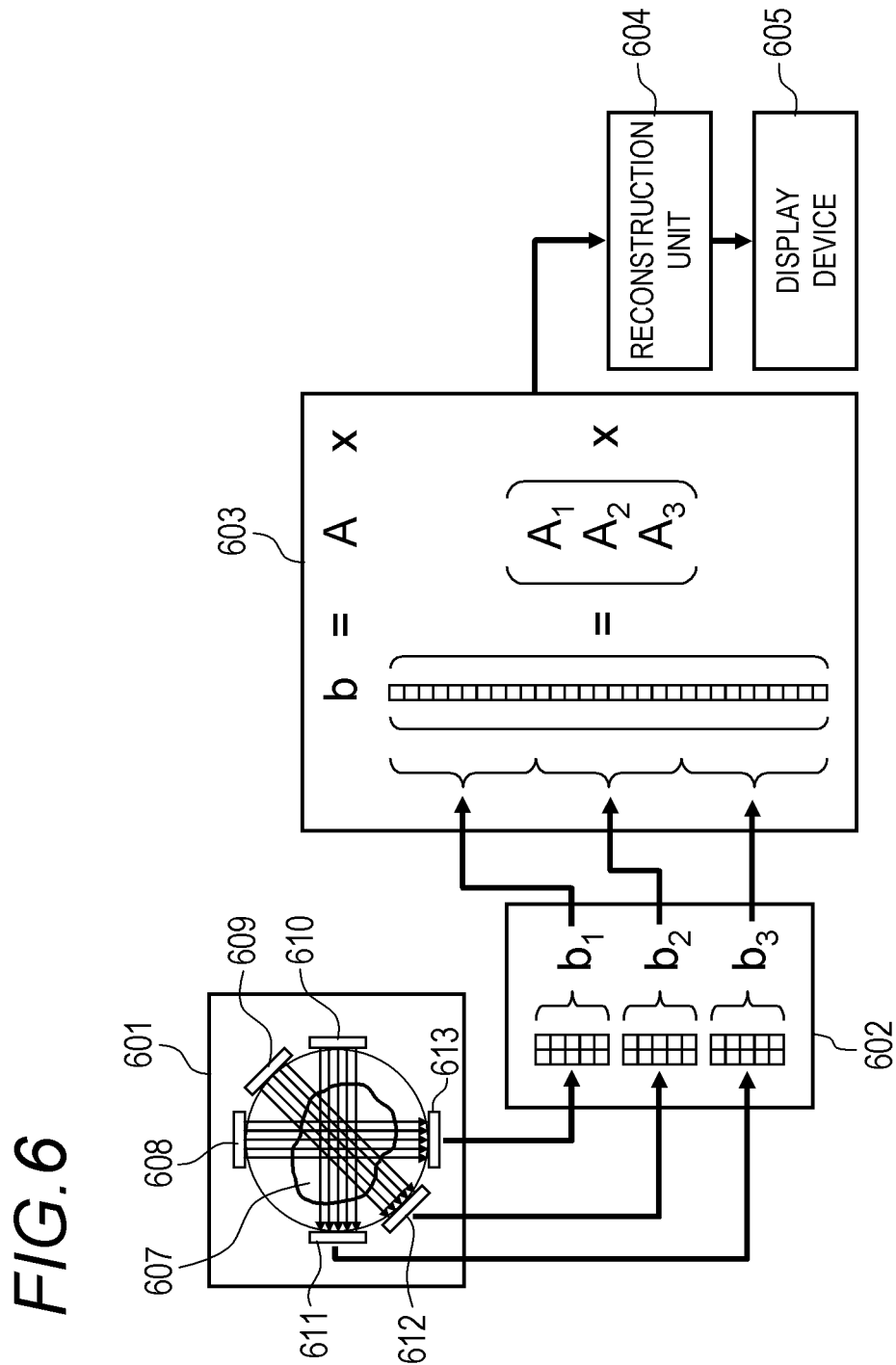
FIG. 6 is a view showing an example of a configuration of a subject information acquisition apparatus to which the solution method according to the present invention is applied.

FIG. 6 is a schematic view showing a configuration of a medical image diagnosis apparatus installed with the solution apparatus according to this embodiment. As shown in the drawing, the medical image diagnosis apparatus includes an observation system (a measurement apparatus) 601, a projection data generation unit 602, a data acquisition unit 603, a reconstruction unit 604, a display device 605, and so on.

The observation system 601 includes a measurement apparatus casing 606, signal generators 608, 609, 610, and detectors 611, 612, 613. The signal generators 608, 609, 610 are devices that irradiate a subject 607 disposed inside the casing 606 with measurement signals. For example, the signal generators 608, 609, 610 are X ray sources in the case of X ray CT, magnetic field generators in the case of MRI, laser beam sources in the case of photoacoustic tomography, and ultrasonic wave generators in the case of an ultrasound diagnosis apparatus. Signals that pass through the subject 607 or signals that are generated in or reflected by the interior of the subject 607 are detected by the detectors 611, 612, 613.

The projection data generation unit 602 groups the signals detected by the plurality of detectors 611, 612, 613 into a single set of observation data in accordance with a predetermined format. For example, the detected signals are grouped together into a vector representation obtained from a raster scan of a two-dimensional image. As a result, respective detected signals $b_1$, $b_2$, $b_3$ are integrated into a single vector b.

The data acquisition unit 603 creates the system of equations Ax=b from the observation data (the vector b) obtained from the projection data generation unit 602 and data (the coefficient matrix A) expressing characteristics of the observation system 601, which are stored in advance. Here, x is an unknown variable and an N-dimensional vector. The coefficient matrix A may be created logically on the basis of physical characteristics of the signal generators and detectors constituting the observation system 601 and so on, or may be created from results obtained by actually measuring a sample having a known internal structure using the observation system 601. $A_1$, $A_2$, $A_3$ in FIG. 6 denote characteristics of the signal generator 608 and the detector 611, characteristics of the signal generator 609 and the detector 612, and characteristics of the signal generator 610 and the detector 613, respectively.

The reconstruction unit 604 determines the unknown variable x using the solution method shown in FIG. 1. The reconstruction unit 604 then generates image data representing the internal structure of the subject 607 on the basis of the obtained solution of the unknown variable x. The generated data are displayed on the display device 605. At this time, either a cross-section (a two-dimensional image) of the subject or the three-dimensional structure of the inside of the subject may be displayed. Operations such as turning and translating the image may be instructed at this time using a user interface.

Incidentally, the solution method according to this embodiment is based on the premise that the majority of the unknown variables x are considered to be zero elements. Hence, when the sparsity of the unknown variable x is insufficient, the estimation precision of the solution may deteriorate and so on such that the expected performance is not obtained. In response to this problem, the data acquisition unit 603 may create a system of equations $(A \Phi^{-1})$ w=b using a coefficient matrix $(A \Phi^{-1})$ instead of the coefficient matrix A, whereupon the reconstruction unit 604 determines an unknown variable w using the solution method shown in FIG. 1 and then calculates the original unknown variable x from $x=\Phi^{-1}$ w. $\Phi$ is a characteristic quantity conversion matrix that exhibits an action for increasing the sparsity of the unknown variable x. In other words, w=$\Phi$ x, which is a variable obtained when the conversion matrix $\Phi$ is applied to the unknown variable x, has a higher sparsity than the variable x, and therefore a solution can be obtained more easily using the method according to this embodiment. A filter that increases the number of zero elements in the image data (the variable x) representing the information relating to the inside of the subject, for example a differential filter, a secondary differential filter, a high pass filter, a cutoff filter, or the like, may be used as the conversion matrix $\Phi$. With this method, a further improvement in the precision of image reconstruction can be expected.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-251768, filed on Dec. 5, 2013, and No. 2014-175455, filed on Aug. 29, 2014, which are hereby incorporated by reference herein in their entirety.

What is claimed is:

1. A subject information acquisition apparatus comprising:
   an observation system that observes a subject and obtains observation data;
   a memory that stores data representing characteristics of the observation system; and
   a processor coupled to the memory, wherein the processor is configured to:
   (i) set an underdetermined system of linear equations Ax=b, where A denotes a matrix of the data representing the characteristics of the observation system, b denotes a constant vector which is data obtained by the observation system, and x denotes unknown vector which is data representing information relating to an inside of the subject;
   (ii) set the vector x or a vector w obtained by w=$\Phi$x, where $\Phi$ is a conversion matrix, as a variable to be determined, in which the number of elements of a variable to be determined is N and the number of linear equations is M, where M and N are integers satisfying $1 \leq M < N$;
   (iii) execute, in each iteration:
      an extraction step of extracting at least M non-zero element candidates from said N elements of said variable;
      a subproblem solving step of setting a subproblem having only said extracted non-zero element candidates as a variable, and solving said subproblem as an ill-posed problem;
      an updating step of updating values of said N elements of said variable to be determined on the basis of values of said non-zero element candidates obtained in said subproblem solving step; and
      a step of determining whether or not the iterative calculations are complete;
   (iv) determine a value at which a value of an objective function defined as a function of the variable or a residual norm of the system of linear equations is minimized, from among values of the variable obtained in each iteration, as a solution of said system of linear equations, when the iterative calculations are complete; and
   (v) generate data representing information relating to the inside of the subject on the basis of the determined solution.

2. The subject information acquisition apparatus according to claim 1, wherein, in said subproblem solving step, said subproblem is solved using a sparse regularization method.

3. The subject information acquisition apparatus according to claim 1, wherein, in said extraction step, said non-zero element candidates to be extracted are determined on the basis of a residual of said linear equation.

4. The subject information acquisition apparatus according to claim 3, wherein, in said extraction step, an element estimated to have a large error is selected from said N elements on the basis of said residual, and said selected element is added to said non-zero element candidates extracted in a previous iteration.

5. The subject information acquisition apparatus according to claim 1, wherein, in each iteration, the processor determines whether or not said iterative calculations are complete on the basis of whether or not a convergence condition, which is constituted by a value of said objective function, the residual norm of said system of linear equations, the number of iterative calculations, or a combination of two or more thereof, is satisfied.

6. The subject information acquisition apparatus according to claim 1, wherein the processor sets the vector w as the variable to be determined, solves the solution of the vector w, and then determines the solution of the vector x from $x=\Phi^{-1}w$.

7. The subject information acquisition apparatus according to claim 1, wherein said conversion matrix $\Phi$ is a filter that increases the number of zero elements in said image data representing said information relating to said inside of said subject.

8. A subject information acquisition method comprising:
a step of obtaining observation data of a subject by an observation system;
a step of obtaining data representing characteristics of the observation system; and
a reconstruction step of reconstructing data representing information relating to an inside of the subject on the basis of the observation data and the data representing characteristics of the observation system, wherein the reconstruction step comprises:
setting an underdetermined system of linear equations Ax=b, where A denotes a matrix of the data representing the characteristics of the observation system, b denotes a constant vector which is the observation data obtained by the observation system, and x denotes unknown vector which is data representing information relating to an inside of the subject;
(ii) setting the vector x or a vector w obtained by w=$\Phi$x, where $\Phi$ is a conversion matrix, as a variable to be determined, in which the number of elements of a variable to be determined is N and the number of linear equations is M, where M and N are integers satisfying 1≤M<N;
(iii) executing, in each iteration:
an extraction step of extracting at least M non-zero element candidates from said N elements of said variable;
a subproblem solving step of setting a subproblem having only said extracted non-zero element candidates as a variable, and solving said subproblem as an ill-posed problem;
an updating step of updating values of said N elements of said variable to be determined on the basis of values of said non-zero element candidates obtained in said subproblem solving step; and
a step of determining whether or not the iterative calculations are complete;
(iv) determining a value at which a value of an objective function defined as a function of the variable or a residual norm of the system of linear equations is minimized, from among values of the variable obtained in each iteration, as a solution of said system of linear equations, when the iterative calculations are complete; and
(v) generating the data representing information relating to the inside of the subject on the basis of the determined solution.

9. A non-transitory computer readable storage medium, storing a program for causing a computer to execute respective steps of a subject information acquisition method, the subject information method comprising:
a step of obtaining observation data of a subject by an observation system;
a step of obtaining data representing characteristics of the observation system; and
a reconstruction step of reconstructing data representing information relating to an inside of the subject on the basis of the observation data and the data representing characteristics of the observation system, wherein the reconstruction step comprises:
(i) setting an underdetermined system of linear equations Ax=b, where A denotes a matrix of the data representing the characteristics of the observation system, b denotes a constant vector which is the observation data obtained by the observation system, and x denotes unknown vector which is data representing information relating to an inside of the subject;
(ii) setting the vector x or a vector w obtained by w=$\Phi$x, where $\Phi$ is a conversion matrix, as a variable to be determined, in which the number of elements of a variable to be determined is N and the number of linear equations is M, where M and N are integers satisfying 1≤M<N;
(iii) executing, in each iteration:
an extraction step of extracting at least M non-zero element candidates from said N elements of said variable;
a subproblem solving step of setting a subproblem having only said extracted non-zero element candidates as a variable, and solving said subproblem as an ill-posed problem;
an updating step of updating values of said N elements of said variable to be determined on the basis of values of said non-zero element candidates obtained in said subproblem solving step; and
a step of determining whether or not the iterative calculations are complete;
(iv) determining a value at which a value of an objective function defined as a function of the variable or a residual norm of the system of linear equations is minimized, from among values of the variable obtained in each iteration, as a solution of said system of linear equations, when the iterative calculations are complete; and
(v) generating the data representing information relating to the inside of the subject on the basis of the determined solution.

* * * * *